United States Patent
Kim et al.

(10) Patent No.: US 12,412,277 B2
(45) Date of Patent: Sep. 9, 2025

(54) APPARATUS, METHOD, AND COMPUTER PROGRAM FOR MEASURING SPATIAL RESOLUTION OF ELECTRO-OPTICAL SYSTEM

(71) Applicant: KOREA AEROSPACE RESEARCH INSTITUTE, Daejeon (KR)

(72) Inventors: Shinwook Kim, Daejeon (KR); Youngchun Youk, Daejeon (KR)

(73) Assignee: KOREA AEROSPACE RESEARCH INSTITUTE, Daejeon (KR)

( * ) Notice: Subject to any disclaimer, the term of this patent is extended or adjusted under 35 U.S.C. 154(b) by 295 days.

(21) Appl. No.: 18/364,898

(22) Filed: Aug. 3, 2023

(65) Prior Publication Data

US 2024/0169548 A1    May 23, 2024

(30) Foreign Application Priority Data

Nov. 17, 2022 (KR) .................. 10-2022-0154704

(51) Int. Cl.
  *G06T 7/13*    (2017.01)
  *G06T 7/168*   (2017.01)

(52) U.S. Cl.
  CPC .............. *G06T 7/13* (2017.01); *G06T 7/168* (2017.01); *G06T 2207/20056* (2013.01); *G06T 2207/20081* (2013.01)

(58) Field of Classification Search
  None
  See application file for complete search history.

(56) References Cited

U.S. PATENT DOCUMENTS

| | | | |
|---|---|---|---|
| 8,837,837 B2 * | 9/2014 | Rezaee | G01M 11/0292 382/199 |
| 12,322,115 B2 * | 6/2025 | Aluru | G06T 7/0002 |
| 2021/0166358 A1 * | 6/2021 | Osterberg | G06T 7/11 |
| 2022/0291317 A1 * | 9/2022 | Blackledge | G01R 33/561 |
| 2023/0345145 A1 * | 10/2023 | Boyaci Mutlu | H04N 25/683 |

OTHER PUBLICATIONS

Song, Jeong-Heon et al., "MTF Measurement Using Edge Method for KOMPSAT-2 Calibration & Validation", Korea Aerospace Research Institute, Aerospace Technology Academic Journal, Aerospace Technology vol. 5, No. 1, Jul. 2006 217-222.

(Continued)

*Primary Examiner* — Edward Park
(74) *Attorney, Agent, or Firm* — Perman & Green, LLP

(57) ABSTRACT

Provided are an apparatus, method, and computer program for measuring spatial resolution of electro-optical system, by which the influence of edge spread function (ESF) by micro-vibrations is mitigated by using deep learning techniques. The method of measuring spatial resolution of electro-optical system includes obtaining raw ESF data from an edge image obtained by using the electro-optical system, obtaining a corrected ESF curve by inputting the raw ESF data to a deep learning model, obtaining a line spread function (LSF) curve by differentiating the corrected ESF curve, obtaining a modulation transfer function (MTF) curve by Fourier-transforming the LSF curve; and obtaining a MTF value from the MTF curve.

12 Claims, 17 Drawing Sheets

(56) References Cited

OTHER PUBLICATIONS

Kim, Eugene D. et al., "MTF Measurement for Flight Model of MAC, a 2.5m GSD Earth Observation Camera", Korea Aerospace Society, Journal of the Korean Aerospace Society, Article 33 Chapter 10 Chapter, Oct. 2005 98-103.
Egbert Buhr et al., 'Simple method for modulation transfer function determination of digital imaging detectors from edge images', Feb. 2003.
Zhongxing Zhou et al., 'Improving the accuracy of MTF measurement at low frequencies based on oversampled edge spread function deconvolution', Jul. 2015.
Jung-Min Kim, 'Edge Profile Correction for Modulation Transfer Function on Digital X-ray Imaging System' Dept. of Radiologic Science, College of Health Science, Korea University, Sep. 2007.

* cited by examiner

APPARATUS, METHOD, AND COMPUTER PROGRAM FOR MEASURING SPATIAL RESOLUTION OF ELECTRO-OPTICAL SYSTEM

CROSS-REFERENCE TO RELATED APPLICATION

This application claims the benefit of Korean Patent Application No. 10-2022-0154704, filed on Nov. 17, 2022, in the Korean Intellectual Property Office, the disclosure of which is incorporated herein in its entirety by reference.

BACKGROUND

1. Field

The disclosure relates to an apparatus, method, and computer program for measuring spatial resolution of electro-optical system.

2. Description of the Related Art

A modulation transfer function (MTF) is one of the major quality factors for evaluating the spatial resolution of electro-optical system. There are various methods for measuring the MTF, and an appropriate method is selected for use according to the characteristics of each industry and technical field. In the satellite payload field, image sensors of a push-broom scanner type have been widely used. In this case, it is typical that image capturing is performing by appropriately moving a knife-edge target and an edge image obtained in this state is used for measuring the MTF.

The MTF measurement method using the edge image includes calculating the MTF through the sharpness of a straight edge located between two light and dark surfaces, in which an edge spread function (ESF) is obtained through the pixel values obtained along an edge centerline, and then, an MTF value is calculated based on the obtained ESF. As such, the measurement result of the MTF is determined depending on the acquisition quality of ESF curves.

However, when the ESF is measured in an electro-optical system assembly environment of an actual satellite, the measurement is greatly affected by the laboratory operating environment. In particular, micro-vibrations generated by the movement of personnel inside the laboratory, the movement of cranes, and air conditioners operating for internal air circulation are added in the form of random noise when acquiring the ESF. For this reason, when measuring the MTF in an actual laboratory, efforts are made to minimize the occurrence of micro-vibrations by stopping all equipment and controlling the personnel, but there may be still vibration sources such as air conditioners in buildings and/or coolers for cooling experimental equipment. Therefore, it can be said that it is impossible to completely block all micro-vibrations.

In order to remove the influence of the micro-vibrations, a line fitting method using a function, such as a hyperbolic tangent, a cubic spline method, or the like, can be applied to derive a trend line and the like from raw data to be used as the ESF. However, when the fitting or spline-based methods are used, over-fitting might occur and the original signal may be estimated as it is, making it impossible to sufficiently remove the influence of vibrations. Also, under-fitting may occur, causing a problem of distorting the unique characteristic curve of the electro-optical system.

SUMMARY

Provided are an apparatus, method, and computer program for measuring spatial resolution of electro-optical system, in which the influence of an edge spread function (ESF) by micro-vibrations is mitigated by using deep learning techniques.

The technical objectives to be achieved by the disclosure are not limited to the above-described objective, and other technical objectives that are not mentioned herein would be clearly understood by a person skilled in the art from the description of the present invention.

According to an aspect of the disclosure, a method of measuring spatial resolution of electro-optical system, the method including obtaining raw ESF data from an edge image obtained by using the electro-optical system, obtaining a corrected ESF curve by inputting the raw ESF data to a deep learning model, obtaining a line spread function (LSF) curve by differentiating the corrected ESF curve, obtaining a modulation transfer function (MTF) curve by Fourier-transforming the LSF curve; and obtaining a MTF value from the MTF curve.

In an embodiment, the method may further include obtaining a plurality of sample ESF data, obtaining a plurality of sample MTF values respectively corresponding to the plurality of sample ESF data, selecting some sample ESF data from among the plurality of sample ESF data based on the plurality of sample MTF values, obtaining a ground-truth ESF curve by averaging the some sample ESF data, and training the deep learning model by using at least one of the plurality of sample ESF data and the ground-truth ESF curve, as training data.

In an embodiment, the obtaining a plurality of sample ESF data may include obtaining a plurality of sample images by capturing images of a plurality of target samples, the plurality of target samples each having a knife-edge located at a preset pixel distance, and obtaining each of the plurality of sample ESF data from the plurality of sample images.

In an embodiment, the obtaining of the ground-truth ESF curve may include arranging the some sample ESF data based on the preset pixel distance, and obtaining the ground-truth ESF curve by averaging the arranged some sample ESF data.

In an embodiment, the deep learning model may be trained based on a central sample ESF data obtained from a target sample in which a knife-edge is located at a center among the plurality of sample ESF data, and the ground-truth ESF curve.

In an embodiment, the selecting of the some sample ESF data may include selecting a plurality of intermediate MTF values located in a middle when the plurality of sample MTF values are arranged in order of size, and selecting the some sample ESF data respectively corresponding to the plurality of intermediate MTF values from among the plurality of sample ESF data.

In an embodiment, the training of the deep learning model may include obtaining an output ESF curve by inputting one of the at least one of the plurality of sample ESF data to the deep learning model, and training the deep learning model to reduce a difference between the output ESF curve and the ground-truth ESF curve.

In an embodiment, the method may further include obtaining a ground-truth LSF curve by differentiating the ground-truth ESF curve, and obtaining a ground-truth MTF curve by Fourier-transforming the ground-truth LSF curve.

In an embodiment, the MTF value may be a value corresponding to a Nyquist frequency value in the MTF curve.

According to another aspect of the disclosure, a computer program stored in a medium to perform, by using a computing device, any one of the methods of measuring spatial resolution of electro-optical system, described above.

According to another aspect of the disclosure, an apparatus for measuring spatial resolution of electro-optical system, the apparatus including a memory, and a processor communicatively connected to the memory, and configured to obtain raw edge spread function (ESF) data from an edge image obtained by using the electro-optical system, obtain a corrected ESF curve by inputting the raw ESF data to a deep learning model, obtain a line spread function (LSF) curve by differentiating the corrected ESF curve, obtain a modulation transfer function (MTF) curve by Fourier-transforming the LSF curve, and obtain an MTF value from the MTF curve.

In an embodiment, the processor may be further configured to obtain a plurality of sample ESF data, obtain a plurality of sample MTF values respectively corresponding to the plurality of sample ESF data, select some sample ESF data from among the plurality of sample ESF data based on the plurality of sample MTF values, obtain a ground-truth ESF curve by averaging the some sample ESF data, and train the deep learning model by using at least one of the plurality of sample ESF data and the ground-truth ESF curve, as training data.

Other aspects, features, and advantages than those described above will become apparent from the following drawings, claims, and detailed description of the disclosure These general and specific embodiments may be implemented by using a system, a method, a computer program, or a combination thereof.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
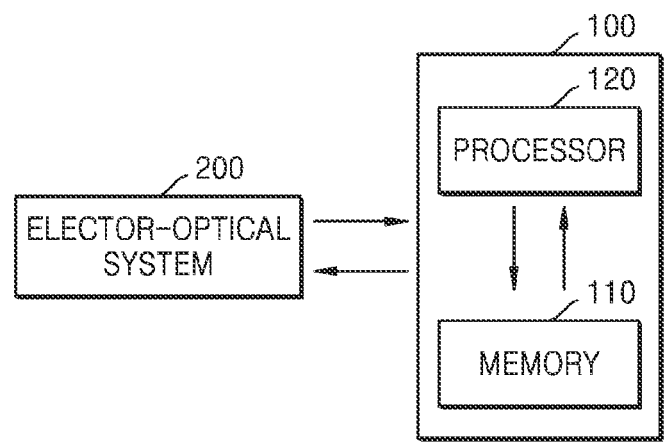
FIG. 1 is a schematic block diagram of a configuration of a system for measuring spatial resolution of electro-optical system, according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Various modifications may be applied to the present embodiments, and particular embodiments will be illustrated in the drawings and described in the detailed description section. The effect and features of the present embodiments, and a method to achieve the same, will be clearer referring to the detailed descriptions below with the drawings. However, the present embodiments may be implemented in various forms, not by being limited to the embodiments presented below.

Hereinafter, exemplary embodiments will be described in detail with reference to the accompanying drawings, and in the description with reference to the drawings, the same or corresponding constituents are indicated by the same reference numerals and redundant descriptions thereof are omitted.

In the following embodiments, it will be understood that although the terms first, second, etc. may be used herein to describe various elements, these elements should not be limited by these terms. These elements are only used to distinguish one element from another.

In the following embodiments, as used herein, the singular forms "a," "an," and "the" are intended to include the plural forms as well, unless the context clearly indicates otherwise.

In the following embodiments, it will be further understood that the terms "comprises" and/or "comprising" used herein specify the presence of stated features or elements, but do not preclude the presence or addition of one or more other features or components.

In the following embodiments, it will be understood that when an element, such as a layer, a film, a region, or a plate, is referred to as being "on" another element, the element can be directly on the other element or intervening elements may be present thereon.

Sizes of elements in the drawings may be exaggerated for convenience of explanation. For example, since sizes and thicknesses of elements in the drawings are arbitrarily illustrated for convenience of explanation, the following embodiments are not limited thereto.

When a certain embodiment may be implemented differently, a specific process order may be performed differently from the described order. For example, two consecutively described processes may be performed substantially at the same time or performed in an order opposite to the described order.

In the specification, the expression such as "A and/or B" may include A, B, or A and B. The expression such as "at least one of A and B" may include A, B, or A and B.

In the following embodiment, it will be understood that when a layer, region, or element is referred to as being "connected to" another layer, region, or element, it can be directly connected to the other layer, region, or component or indirectly connected to the other layer, region, or component via intervening layers, regions, or components. For example, in the specification, when a layer, region, or component is referred to as being electrically connected to another layer, region, or component, it can be directly electrically connected to the other layer, region, or component or indirectly electrically connected to the other layer, region, or component via intervening layers, regions, or components.

The x-axis, the y-axis, and the z-axis are not limited to three axes of the rectangular coordinate system, and may be interpreted in a broader sense. For example, the x-axis, the y-axis, and the z-axis may be perpendicular to one another, or may represent different directions that are not perpendicular to one another.

FIG. 1 is a schematic block diagram of a configuration of a system for measuring spatial resolution of electro-optical system, according to an embodiment.

Referring to FIG. 1, the system for measuring spatial resolution of electro-optical system may include a spatial resolution measurement apparatus 100 and electro-optical system 200.

The spatial resolution measurement apparatus 100 and the electro-optical system 200 may communicate with each other. For example, the spatial resolution measurement apparatus 100 and the electro-optical system 200 may wirelessly communicate with each other through various wireless communication technologies such as a wireless LAN (WiFi), SingleHop, Multi-hop, Bluetooth, and the like. Although not illustrated in FIG. 1, the system for measuring spatial resolution of electro-optical system may include a wireless repeater for repeating wireless communication between the spatial resolution measurement apparatus 100 and the electro-optical system 200. The wireless repeater may form a wireless communication network, and may include various wireless communication technologies, such as a wireless LAN, SingleHop, Multi-hop, Bluetooth, and the like.

The spatial resolution measurement apparatus 100 may include a memory 110 and a processor 120.

The memory 110 may include, as a computer-readable recording medium, a permanent mass storage device, such as a random access memory (RAM), a read only memory (ROM), and a disk drive. Furthermore, the memory 110 may store an operating system and at least one program code. For example, the memory 110 may store an edge image, raw edge spread function (ESF) data $ESF_{Raw}$ (see FIG. 3), a deep learning model $ESF_{Net}$ (see FIG. 3), a ground-truth ESF curve $ESF_{GT}$ (see FIG. 3), or the like, which are received from the electro-optical system 200 to be described below.

The processor 120 may mean a data processing device included in hardware and having a physically structured circuit to perform a function represented by code or commands included in a program. For example, the processor 120 may be configured to execute a command received according to a program code stored in a recording device such as the memory 110. As such, examples of a data processing device included in hardware include processing devices such as a microprocessor, a central processing unit (CPU), a processor core, a multiprocessor, an application-specific integrated circuit (ASIC), a field programmable gate array (FPGA), and the like, but the scope of the disclosure is not limited thereto.

Figure 2:
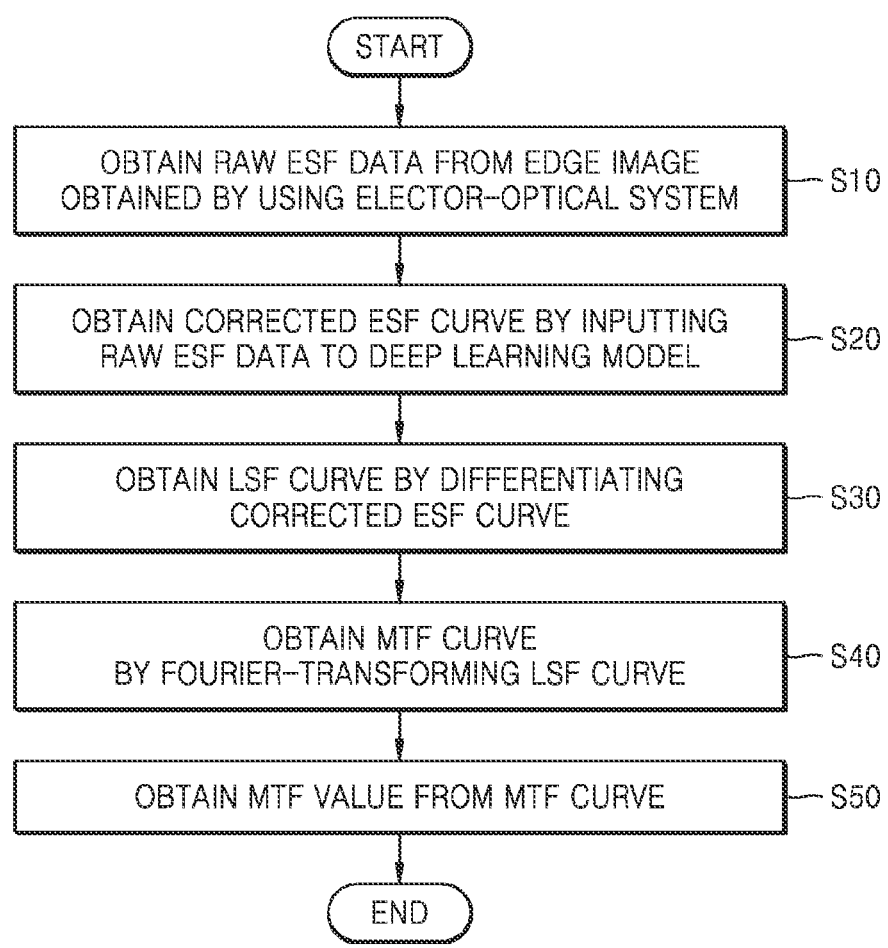
FIG. 2 is a flowchart showing at least some operations of a method of measuring spatial resolution of electro-optical system, according to an embodiment.
Figure 3:
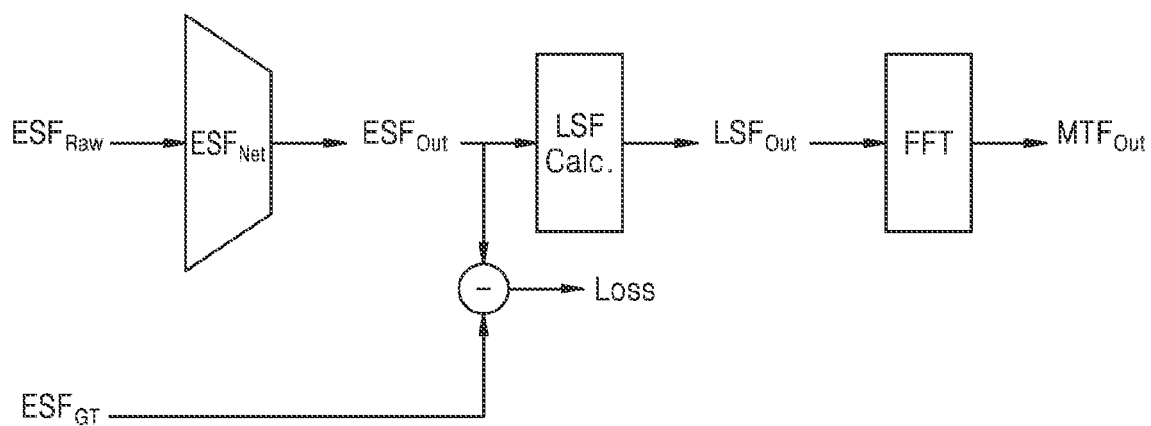
FIG. 3 is a block diagram showing at least some operations of a method of measuring spatial resolution of electro-optical system, according to an embodiment.
Figure 4:
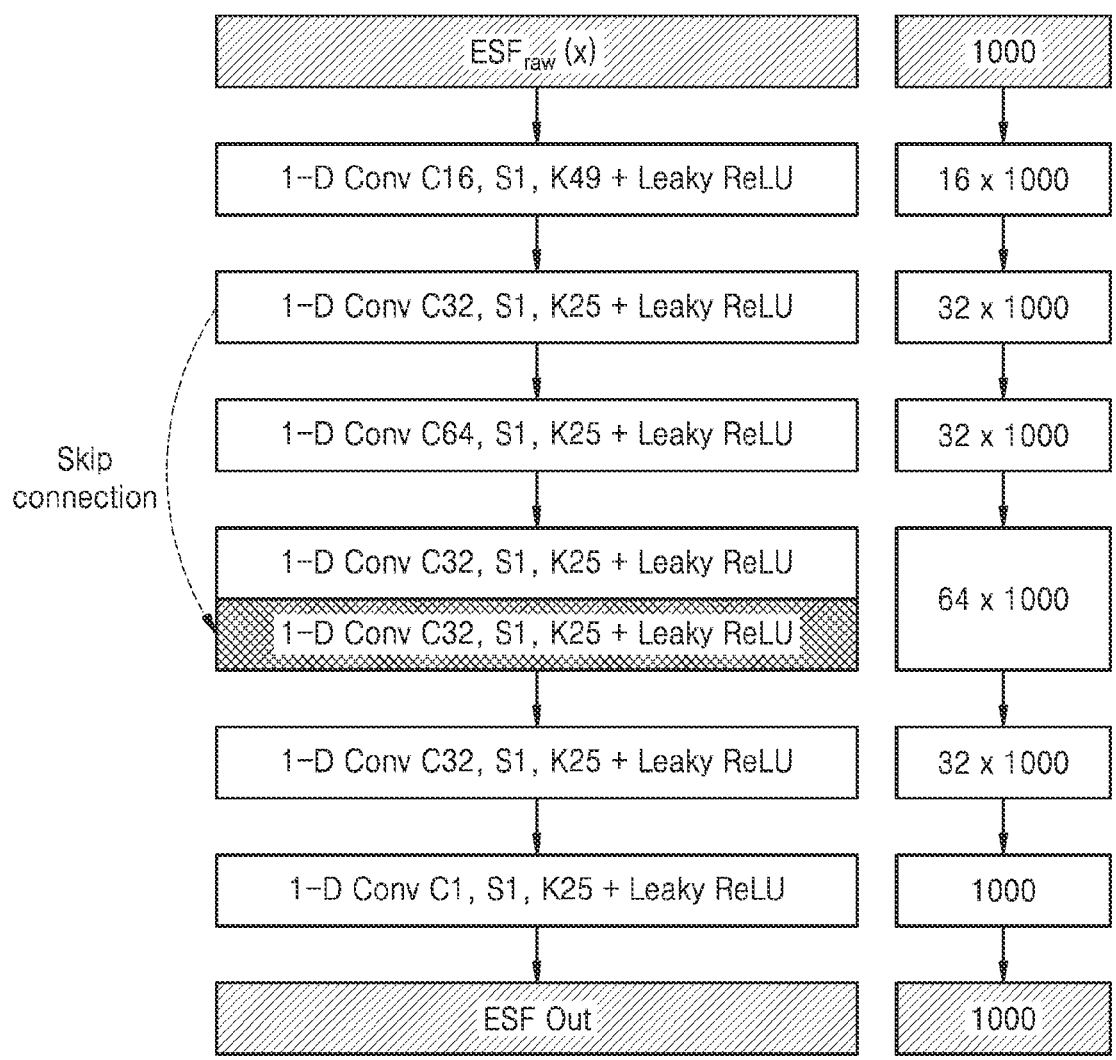
FIG. 4 is a flowchart showing a deep learning model according to an embodiment.
Figure 5:
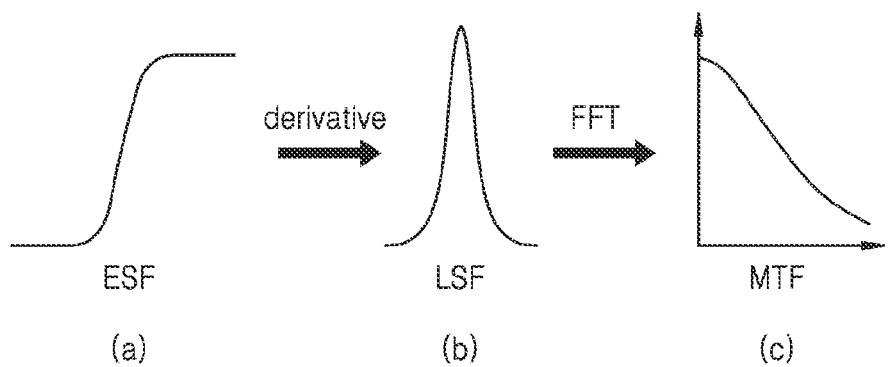
FIG. 5 is a view for explaining at least some operations of a method of measuring spatial resolution of electro-optical system, according to an embodiment.

FIG. 2 is a flowchart showing at least some operations of a method of measuring spatial resolution of electro-optical system, according to an embodiment. FIG. 3 is a block diagram showing at least some operations of a method of measuring spatial resolution of electro-optical system, according to an embodiment, and FIG. 4 is a flowchart showing a deep learning model according to an embodiment. FIG. 5 is a view for explaining at least some operations of a method of measuring spatial resolution of electro-optical system, according to an embodiment. The spatial resolution measurement method by an electro-optical system according to an embodiment may be performed through the processor 120 of FIG. 1.

Referring to FIGS. 2 and 3 together, first, raw ESF data $ESF_{Raw}$ may be obtained from an edge image obtained by using the electro-optical system (S10). In this state, the edge image may be an image of a target having a knife-edge KE located between two bright and dark surfaces, like a target sample TS illustrated in FIG. 9 to be described below. The raw ESF data $ESF_{Raw}$ may be raw data obtained from the edge image or data obtained by at least partially removing noise from the raw data (e.g., having passed through a noise removal filter).

After obtaining the raw ESF data $ESF_{Raw}$, the raw ESF data $ESF_{Raw}$ is input to a deep learning model $ESF_{Net}$ so that a corrected ESF curve $ESF_{Out}$ may be obtained (S20).

In an embodiment, the deep learning model $ESF_{Net}$ may have a structure illustrated in FIG. 4. The input ($ESF_{raw}(x)$ of FIG. 4) of the deep learning model $ESF_{Net}$ is the raw ESF data $ESF_{Raw}$, and the output (ESF Out of FIG. 4) of the deep learning model $ESF_{Net}$ is the corrected ESF curve $ESF_{Out}$. In a deep learning network for general objection recognition and image generation, a 2D Convolution layer is generally used, but in the disclosure, as the raw ESF data $ESF_{Raw}$ used as an input is one-dimensional data, the deep learning model $ESF_{Net}$ may form a network by employing a 1D convolution layer. Furthermore, in the deep learning model $ESF_{Net}$, by locating one Skip connection in the middle, the feature of the middle of the network is moved, as it is, to an output end so that the original ESF feature may be sufficiently reflected.

In an embodiment, the deep learning model $ESF_{Net}$ may be trained by using, as training data, at least one of a plurality of sample ESF data ESF_S1-S13 illustrated in FIG. 10 to be described below, and a ground-truth ESF curve $ESF_{GT}$. The ground-truth ESF curve $ESF_{GT}$ is an ESF curve calculated based on the flowchart in FIGS. 11 and 12 to be described below. An example of the ground-truth ESF curve $ESF_{GT}$ is illustrated in FIG. 13 to be described below.

In an embodiment, the deep learning model $ESF_{Net}$ may be trained based on Equation 1 below.

$$\text{Loss} = \sum_{i=0}^{N} |ESF_{Out}(i) - ESF_{GT}(i)| \quad \text{[Equation 1]}$$

In Equation 1, I and N are integers, $ESF_{Out}(i)$ is the output ESF curve, and $ESF_{GT}(i)$ is the ground-truth ESF curve $ESF_{GT}$. The output ESF curve may be a curve output by inputting one of the sample ESF data ESF_S1-S13 to the deep learning model $ESF_{Net}$. For example, the output ESF curve may be the corrected ESF curve $ESF_{Out}$.

The deep learning model $ESF_{Net}$ may be trained such that a difference between the output ESF curve and the ground-truth ESF curve $ESF_{GT}$ is reduced. In other words, the deep learning model $ESF_{Net}$ may be trained such that the loss of Equation 1 may be reduced.

After obtaining the corrected ESF curve $ESF_{Out}$, a line spread function (LSF) curve $LSF_{Out}$ may be obtained by differentiating the corrected ESF curve $ESF_{Out}$ (S30). As illustrated in (a) and (b) of FIG. 5, the LSF curve $LSF_{Out}$ may be calculated by primarily differentiating the corrected ESF curve $ESF_{Out}$.

After obtaining the LSF curve $LSF_{Out}$, a modulation transfer function (MTF) curve $MTF_{Out}$ may be obtained by Fourier-transforming the LSF curve $LSF_{Out}$ (S40). As illustrated in (b) and (c) of FIG. 5, the MTF curve $MTF_{Out}$ may be calculated by transforming the LSF curve $LSF_{Out}$ into a frequency domain through the Fourier transformation.

After obtaining the MTF curve $MTF_{Out}$, an MTF value may be obtained from the MTF curve $MTF_{Out}$ (S50). The MTF value may be a value corresponding to a Nyquist frequency value in the MTF curve $MTF_{Out}$.

In an embodiment, when the raw ESF data $ESF_{Raw}$ obtained in a micro-vibration environment is input to the deep learning model $ESF_{Net}$, the corrected ESF curve $ESF_{Out}$ may be obtained by removing the influence of vibrations from the raw ESF data $ESF_{Raw}$. When the MTF curve $MTF_{Out}$ is obtained from the corrected ESF curve $ESF_{Out}$, the MTF curve $MTF_{Out}$ may be prevented from being distorted by the micro-vibrations. The MTF value measured at the Nyquist frequency of the MTF curve $MTF_{Out}$ in which distortion is prevented may accurately represent the spatial resolution feature of the electro-optical system.

Figure 6:
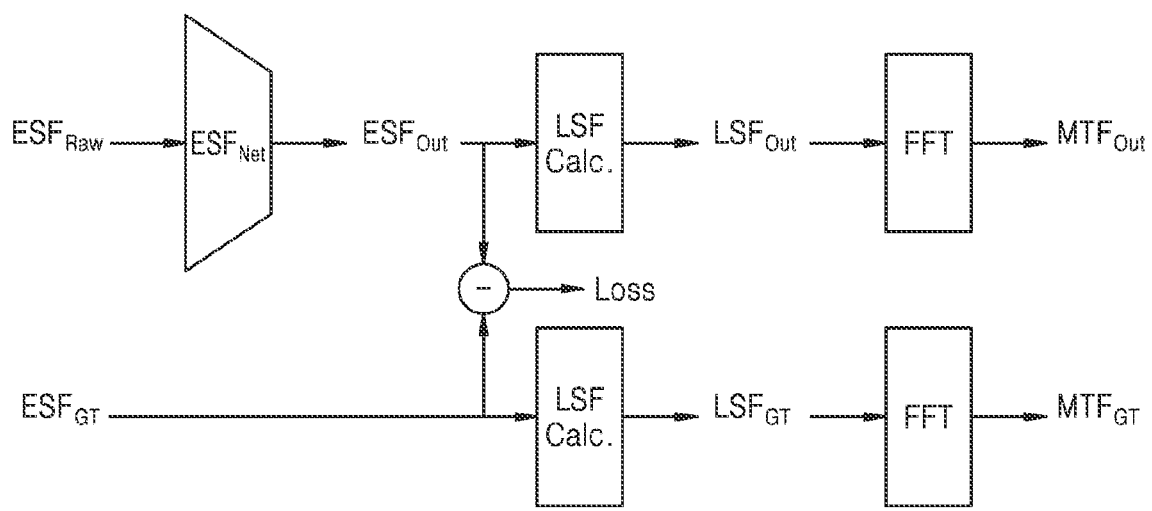
FIG. 6 is a block diagram showing at least some operations of a method of measuring spatial resolution of electro-optical system, according to an embodiment.

FIG. 6 is a block diagram showing at least some operations of a method of measuring spatial resolution of electro-optical system, according to an embodiment. FIG. 6 is a modified embodiment of FIG. 3, and there are differences in some operations. In the following description, redundant descriptions with those of FIG. 3 are omitted, and differences only are described below.

Referring to FIG. 6, a ground-truth LSF curve $LSF_{GT}$ may be obtained by differentiating the ground-truth ESF curve $ESF_{GT}$. As illustrated in (a) and (b) of FIG. 5, the ground-truth LSF curve $LSF_{GT}$ may be calculated by primarily differentiating the ground-truth ESF curve $ESF_{GT}$. The ground-truth LSF curve $LSF_{GT}$ may be used as training data for training the deep learning model $ESF_{Net}$.

After obtaining the ground-truth LSF curve $LSF_{GT}$, a ground-truth MTF curve $MTF_{GT}$ may be obtained by Fourier-transforming the ground-truth LSF curve $LSF_{GT}$. As illustrated in (b) and (c) of FIG. 5, the ground-truth MTF curve $MTF_{GT}$ may be calculated by transforming the ground-truth LSF curve $LSF_{GT}$ into a frequency domain through the Fourier transformation. The ground-truth MTF curve $MTF_{GT}$ may be used as training data for training the deep learning model $ESF_{Net}$.

Figure 7:
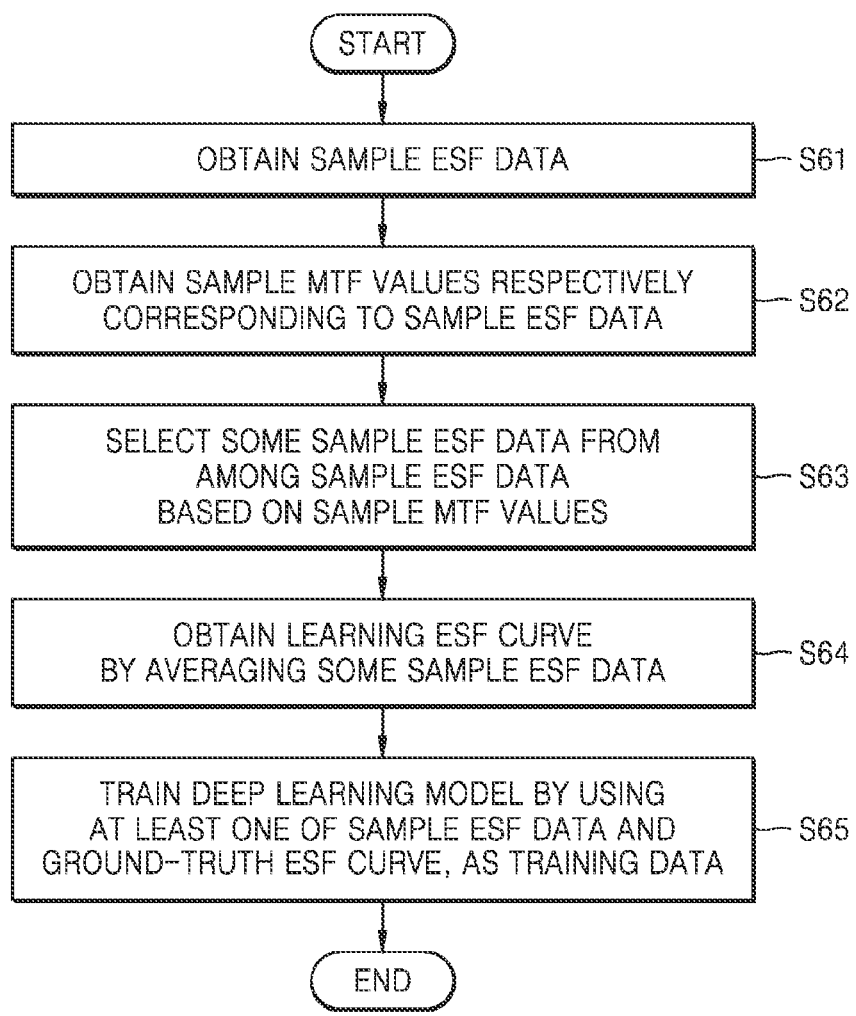
FIG. 7 is a flowchart showing at least some operations of a method of measuring spatial resolution of electro-optical system, according to an embodiment.
Figure 8:
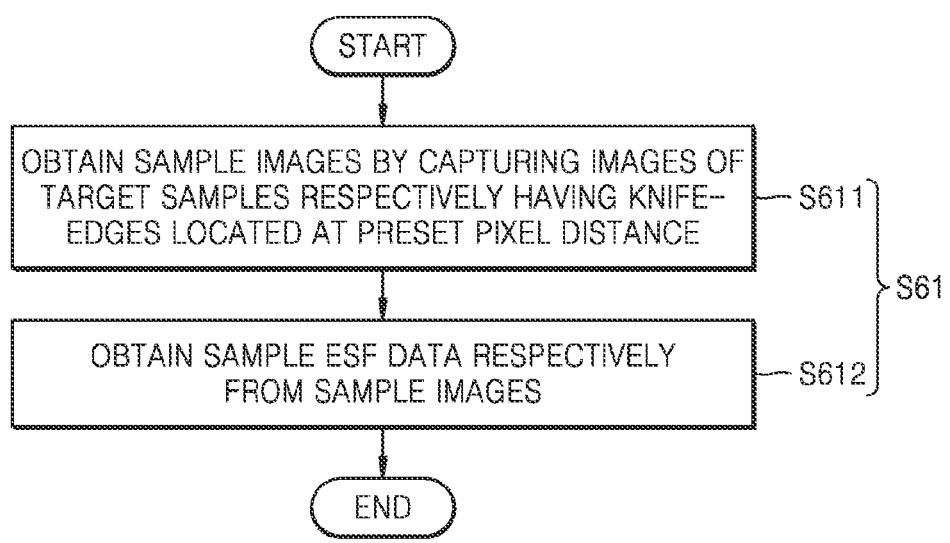
FIG. 8 is a flowchart showing at least some operations of a method of measuring spatial resolution of electro-optical system, according to an embodiment.
Figure 9:
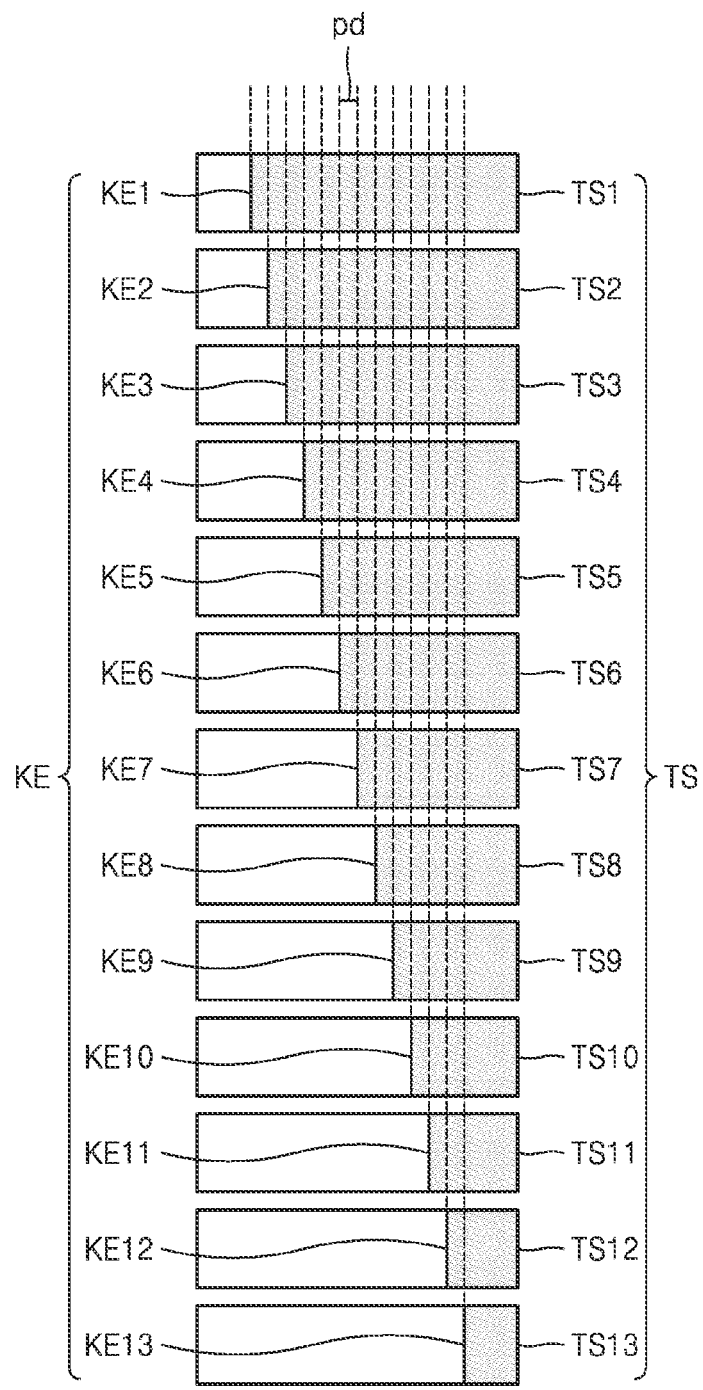
FIG. 9 is a view for explaining at least some operations of a method of measuring spatial resolution of electro-optical system, according to an embodiment.
Figure 10:
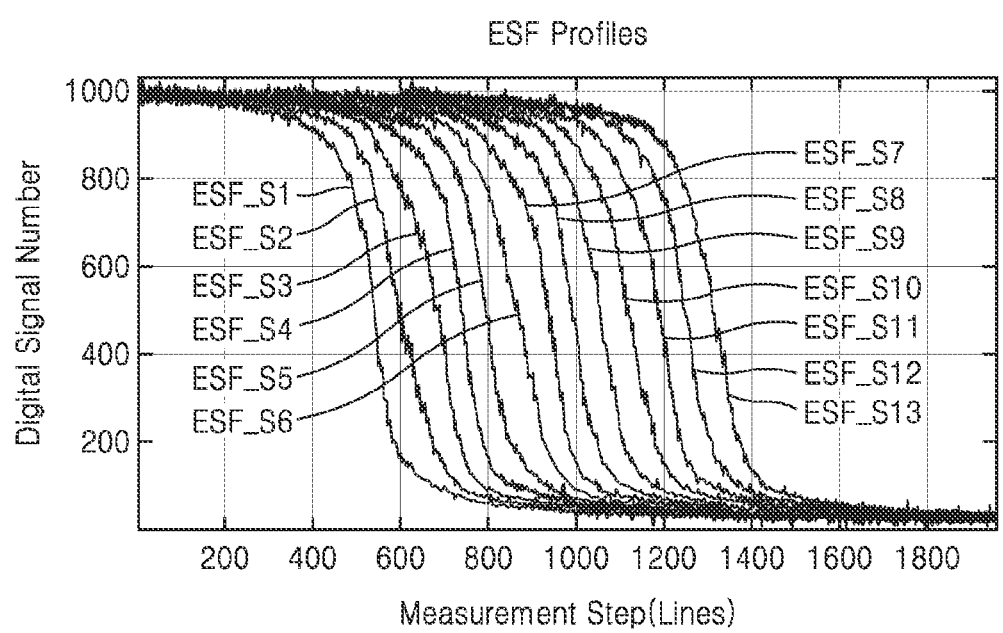
FIG. 10 is a graph for explaining at least some operations of a method of measuring spatial resolution of electro-optical system, according to an embodiment.

FIGS. 7, 8, 11, and 12 are flowcharts showing at least some operations of the method of measuring spatial resolution of electro-optical system, according to an embodiment, and FIGS. 9, 10, and 13 are a view and graphs showing at least some operations of the method of measuring spatial resolution of electro-optical system, according to an embodiment.

First, referring to FIG. 7, a plurality of sample ESF data ESF_S1-S13 (see FIG. 10) may be obtained (S61).

The obtaining of the sample ESF data ESF_S1-S13 (S61) may include, as illustrated in FIG. 8, obtaining a plurality of sample images by capturing images of a plurality of target samples TS (see FIG. 9) respectively having knife-edges KE (see FIG. 9) located at a preset pixel distance pd (see FIG. 9) (S611) and obtaining the sample ESF data ESF_S1-S13 respectively from the sample images (S612).

For example, as illustrated in FIG. 9, sample images may be obtained by capturing images of first to thirteenth target samples TS1-TS13 respectively having first to thirteenth knife-edges KE1-KE13. In this state, the seventh knife-edge KE7 of the seventh target sample TS7 is located at the center. The sixth knife-edge KE6 of the sixth target sample TS6 is separated by the pixel distance pd to the left from the seventh knife-edge KE7, and the eighth knife-edge KE8 of the eighth target sample TS8 is separated by the pixel distance pd to the right from the seventh knife-edge KE7. The fifth knife-edge KE5 of the fifth target sample TS5 is separated by a two-pixel distance 2 pd to the left from the seventh knife-edge KE7, and the ninth knife-edge KE9 of the ninth target sample TS9 is separated by a two-pixel distance 2 pd to the right from the seventh knife-edge KE7. The fourth knife-edge KE4 of the fourth target sample TS4 is separated by three pixel distances 3 pd to the left from the seventh knife-edge KE7, and the tenth knife-edge KE10 of the tenth target sample TS10 is separated by the three pixel distance 3 pd to the right from the seventh knife-edge KE7 3. The third knife-edge KE3 of the third target sample TS3 is separated by four pixel distances 4 pd to the left from the seventh knife-edge KE7, and the eleventh knife-edge KE11 of the eleventh target sample TS11 is separated by the four pixel distance 4 pd to the right from the seventh knife-edge KE7. The second knife-edge KE2 of the second target sample TS2 is separated by five pixel distances 5 pd to the left from the seventh knife-edge KE7 5, and the twelfth knife-edge KE12 of the twelfth target sample TS12 is separated by the five pixel distances 5 pd to the right from the seventh knife-edge KE7. The first knife-edge KE1 of the first target sample TS1 is separated by six pixel distances 6 pd to the left from the seventh knife-edge KE7, and the thirteenth knife-edge KE13 of the thirteenth target sample TS13 is separated by the six pixel distances 6 pd to the right from the seventh knife-edge KE7.

As illustrated in FIG. 10, the first sample ESF data ESF_S1 is obtained from a sample image obtained by capturing an image of the first target sample TS1. The second sample ESF data ESF_S2 is obtained from a sample image obtained by capturing an image of the second target sample TS2. The third sample ESF data ESF_S3 is obtained from a sample image obtained by capturing an image of the third target sample TS3. The fourth sample ESF data ESF_S4 is obtained from a sample image obtained by capturing an image of the fourth target sample TS4. The fifth sample ESF data ESF_S5 is obtained from a sample image obtained by capturing an image of the fifth target sample TS5. The sixth sample ESF data ESF_S6 is obtained from a sample image obtained by capturing an image of the sixth target sample TS6. The seventh sample ESF data ESF_S7 is obtained from a sample image obtained by capturing an image of the seventh target sample TS7. The eighth sample ESF data ESF_S8 is obtained from a sample image obtained by capturing an image of the eighth target sample TS8. The ninth sample ESF data ESF_S9 is obtained from a sample image obtained by capturing an image of the ninth target sample TS9. The tenth sample ESF data ESF_S10 is obtained from a sample image obtained by capturing an image of the tenth target sample TS10. The eleventh sample ESF data ESF_S11 is obtained from a sample image obtained by capturing an image of the eleventh target sample TS11. The twelfth sample ESF data ESF_S12 is obtained from a sample image obtained by capturing an image of the twelfth target sample TS12. The thirteenth sample ESF data ESF_S13 is obtained from a sample image obtained by capturing an image of the thirteenth target sample TS13. The sample ESF data ESF_S1-S13 may represent signals of a target captured at different timings due to the characteristics of a push-broom sensor.

Referring back to FIG. 7, after obtaining the sample ESF data ESF_S1-S13, a plurality of sample MTF values respectively corresponding to the sample ESF data ESF_S1-S13 may be obtained (S62). The sample MTF values may be obtained from a plurality of sample MTF curves. The sample MTF curves may be obtained by respectively Fourier transforming a plurality of sample LSF curves, and the sample LSF curves may be obtained by differentiating the sample ESF data ESF_S1-S13. When the sample ESF data ESF_S1-S13 are respectively differentiated, differentiation may be performed after at least partially removing noise of the sample ESF data ESF_S1-S13 (e.g., after passing through a noise removal filter).

After obtaining the sample MTF values, some sample ESF data ESF_S1-S13 may be selected based on the sample MTF values (S63).

Figure 11:
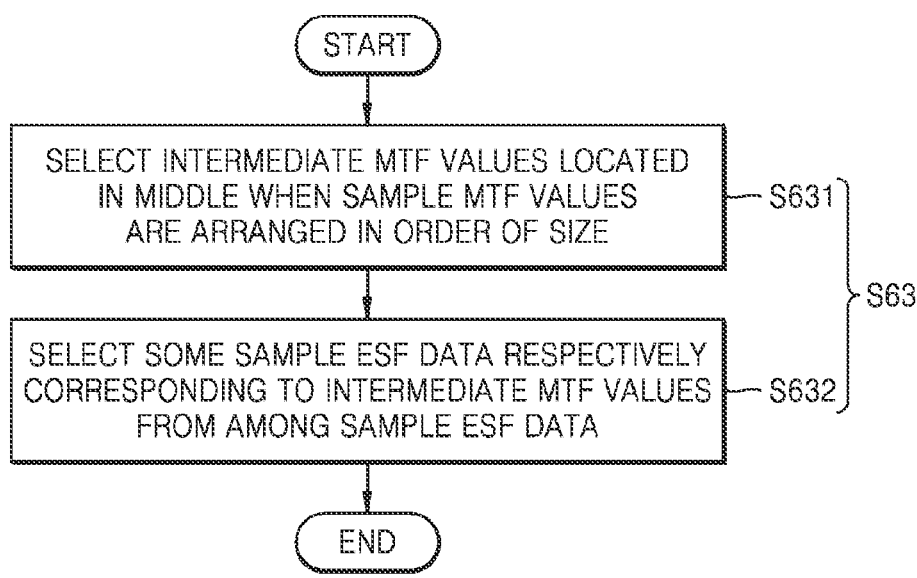
FIG. 11 is a flowchart showing at least some operations of a method of measuring spatial resolution of electro-optical system, according to an embodiment.

The selecting of some sample ESF data ESF_S1-S13 (S63) may include, as illustrated in FIG. 11, selecting a plurality of intermediate MTF values that are located in the middle when the sample MTF values are arranged in order of size (S631) and selecting some sample ESF data respectively corresponding to the intermediate MTF values among the sample ESF data ESF_S1-S13 (S632).

For example, when the sample MTF values are arranged in order of size, five intermediate MTF values, except upper four sample MTF values and lower four sample MTF values, may be selected. Among the sample ESF data ESF_S1-S13, some sample ESF data respectively corresponding to the five intermediate MTF values may be selected.

Referring back to FIG. 7, after selecting some sample ESF data, a ground-truth ESF curve $ESF_{GT}$ (see FIG. 3) may be obtained by averaging some sample ESF data (S64).

Figure 12:
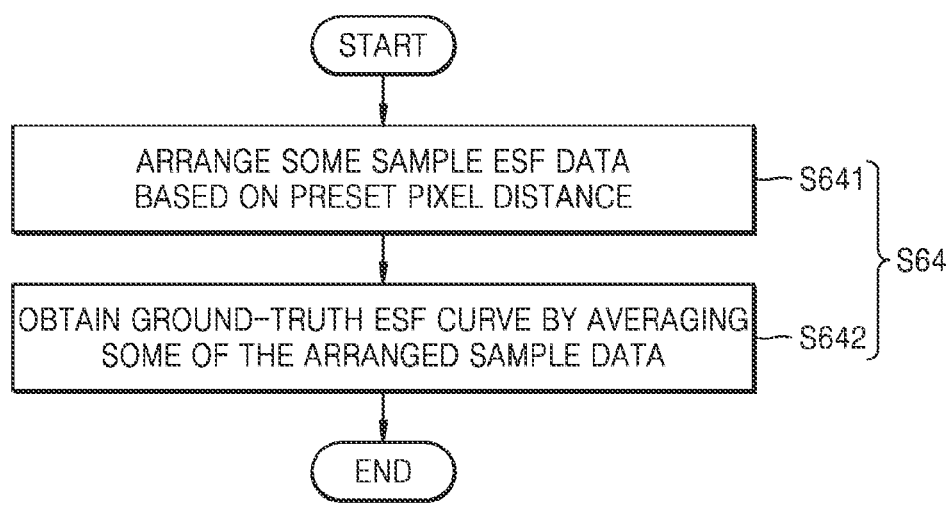
FIG. 12 is a flowchart showing at least some operations of a method of measuring spatial resolution of electro-optical system, according to an embodiment.
Figure 13:
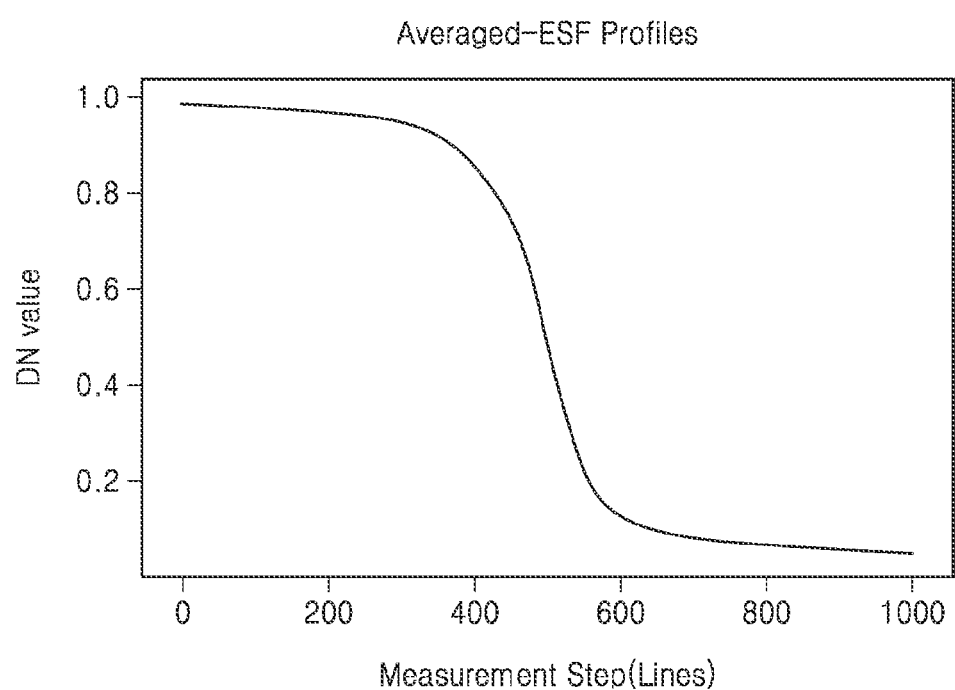
FIG. 13 is a graph for explaining at least some operations of a method of measuring spatial resolution of electro-optical system, according to an embodiment.

The obtaining of the ground-truth ESF curve $ESF_{GT}$ (S64) may include, as illustrated in FIG. 12, arranging some sample ESF data based on the preset pixel distance pd (S641) and obtaining the ground-truth ESF curve $ESF_{GT}$ by averaging some of the arranged sample ESF data (S642).

For example, with reference to FIG. 10, some sample ESF data may include the fourth sample ESF data ESF_S4, the fifth sample ESF data ESF_S5, the seventh sample ESF data ESF_S7, the eleventh sample ESF data ESF_S11, and the twelfth sample ESF data ESF_S12. By shifting the fourth sample ESF data ESF_S4 to the right by three pixel distances 3 pd, the fifth sample ESF data ESF_S5 to the right by two pixel distances 2 pd, the eleventh sample ESF data ESF_S11 to the left by four pixel distances 4 pd, and the twelfth sample ESF data ESF_S12 to the left by five pixel distances 5 pd, the fourth sample ESF data ESF_S4, the fifth sample ESF data ESF_S5, the seventh sample ESF data ESF_S7, the eleventh sample ESF data ESF_S11, and the twelfth sample ESF data ESF_S12 may be arranged in the middle. The ground-truth ESF curve $ESF_{GT}$ may be obtained by averaging the fourth sample ESF data ESF_S4, the fifth sample ESF data ESF_S5, the seventh sample ESF data ESF_S7, the eleventh sample ESF data ESF_S11, and the twelfth sample ESF data ESF_S12, which are arranged in the middle.

An example of the ground-truth ESF curve $ESF_{GT}$ obtained by the method described above is illustrated in FIG. 13. As micro-vibrations applied to a resolution measurement environment have the characteristics such as random noise, when various signals are averaged, the magnitude thereof converges at 0, noise of the ground-truth ESF curve $ESF_{GT}$ obtained by averaging some of the arranged sample ESF data converges at 0.

Referring back to FIG. 7, the deep learning model $ESF_{Net}$ (see FIG. 3) may be trained by using at least one of the sample ESF data ESF_S1-S13 and the ground-truth ESF curve $ESF_{GT}$, as training data (S65). For example, the deep learning model $ESF_{Net}$ may be trained based on the seventh sample ESF data (or, central sample ESF data) ESF_S7 obtained from the seventh target sample TS7 having the knife-edge KE located at the center among the sample ESF data ESF_S1-S13, and the ground-truth ESF curve $ESF_{GT}$.

Figure 14:
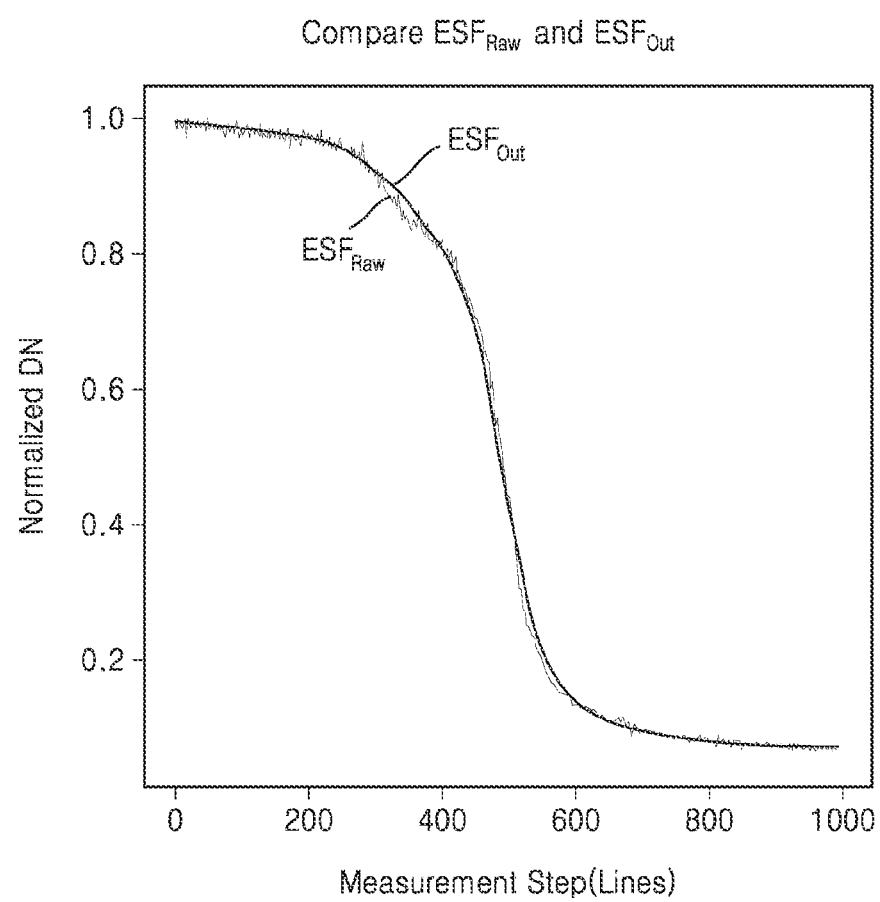
FIG. 14 is a graph showing a comparison between an edge spread function (ESF) curve and raw ESF data in a method of measuring spatial resolution of electro-optical system, according to an embodiment.

FIG. 14 is a graph showing a comparison between an ESF curve and raw ESF data in a method of measuring spatial resolution of electro-optical system, according to an embodiment.

Referring to FIG. 14, for the raw ESF data $ESF_{Raw}$, it may be seen that distortion is generated in an edge portion due to the micro-vibrations generated in the resolution measurement environment. Unlike the above, for an ESF curve $ESF_{Out}$ generated by the deep learning model $ESF_{Net}$, it may be seen that the influence of micro-vibrations is mitigated by correcting the micro-vibrations.

Figure 15:
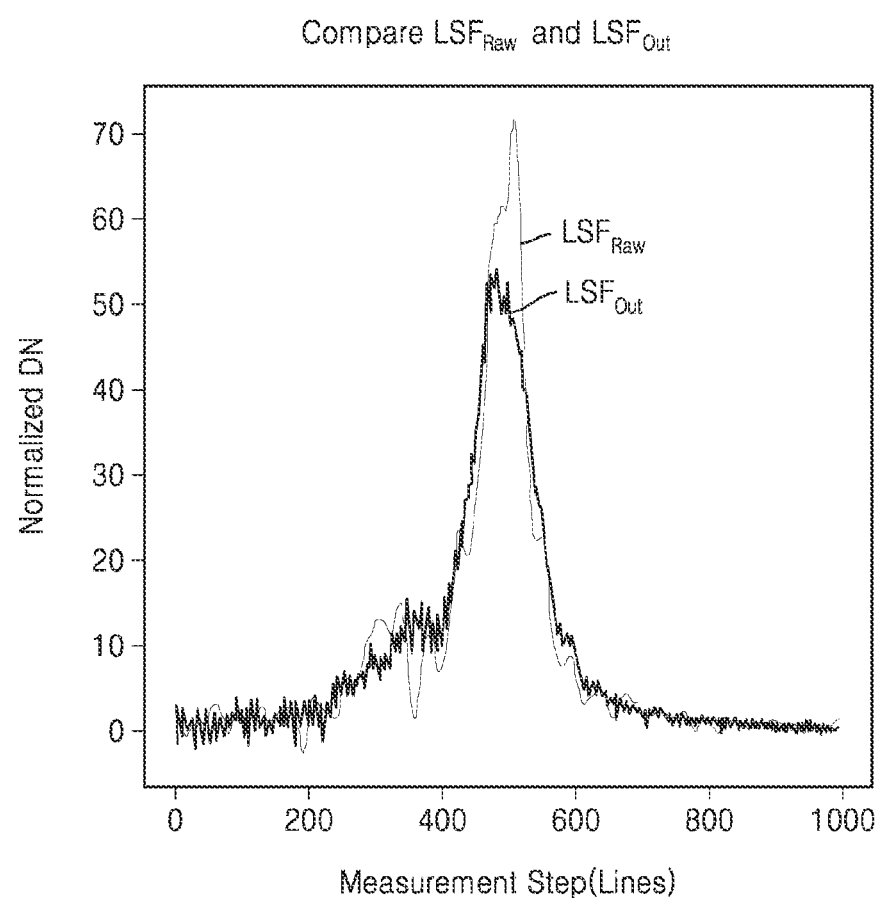
FIG. 15 is a graph showing a comparison between an LSF curve and a raw LSF curve according to a method of measuring spatial resolution of electro-optical system, according to an embodiment.

FIG. 15 is a graph showing a comparison between an LSF curve and a raw LSF curve according to a method of measuring spatial resolution of electro-optical system, according to an embodiment.

Referring to FIG. 15, for a raw LSF curve $LSF_{Raw}$ calculated by differentiating the raw ESF data $ESF_{Raw}$, it may be seen that distortion is generated in the curve due to micro-vibrations generated in the resolution measurement environment. Unlike the above, for the LSF curve $LSF_{Out}$ calculated by differentiating the ESF curve $ESF_{Out}$ generated by the deep learning model $ESF_{Net}$, it may be seen that the influence of micro-vibrations is mitigated by correcting the micro-vibrations.

Figure 16:
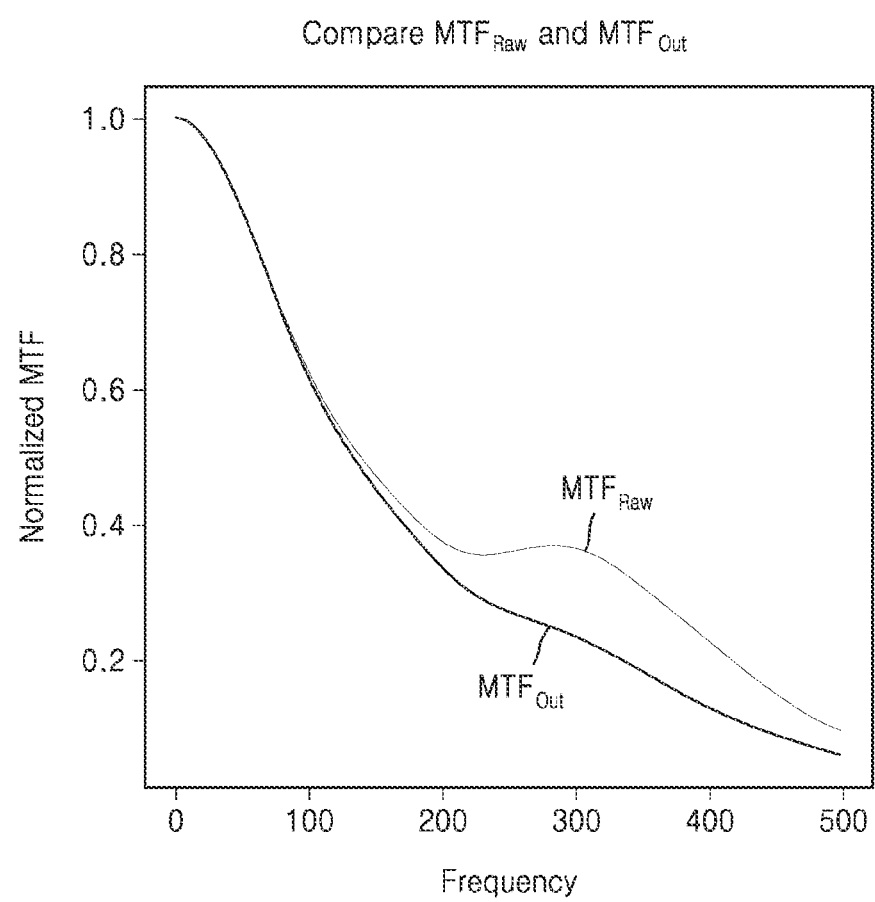
FIG. 16 is a graph showing a comparison between an MTF curve and a raw MTF curve according to a method of measuring spatial resolution of electro-optical system, according to an embodiment.

FIG. 16 is a graph showing a comparison between an MTF curve and a raw MTF curve according to a method of measuring spatial resolution of electro-optical system, according to an embodiment.

Referring to FIG. 16, it may be seen that a raw MTF curve $MTF_{Raw}$ calculated by Fourier transforming the raw LSF curve $LSF_{Raw}$ has a distorted portion in which a value is suddenly increased in a high frequency area. Unlike the above, it may be seen that the MTF curve $MTF_{Out}$ calculated by Fourier transforming the LSF curve $LSF_{Out}$ naturally and gradually drops toward a high frequency. Thus, the distortion of the MTF curve $MTF_{Out}$ due to micro-vibrations may be prevented, and in a Nyquist frequency of the MTF curve $MTF_{Out}$ where distortion is prevented, the measured MTF value may accurately represent the spatial resolution feature of the electro-optical system.

Figure 17A:
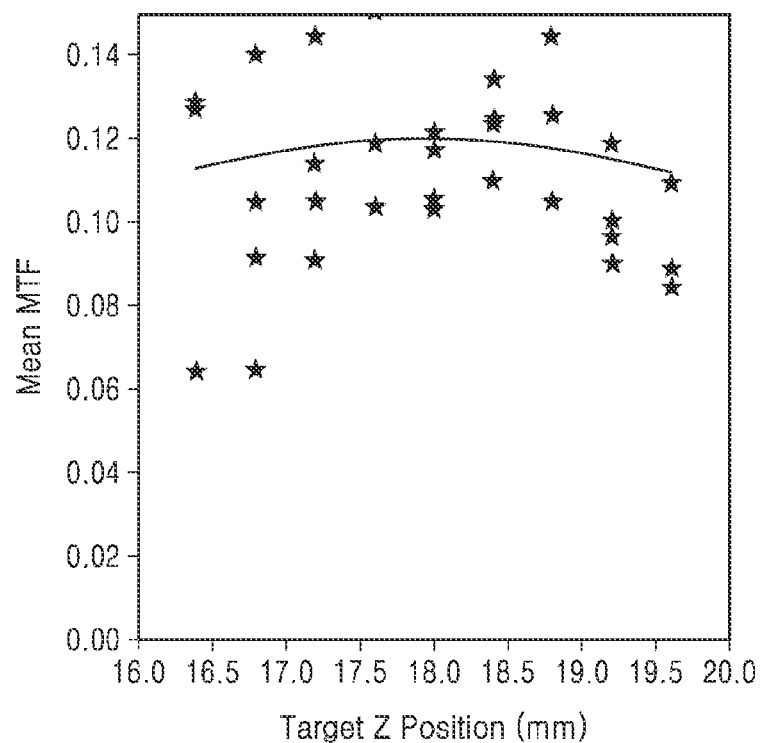
FIGS. 17A and 17B are graphs showing a comparison between an MTF value and a raw MTF value according to a method of measuring spatial resolution of electro-optical system, according to an embodiment.
Figure 17B:
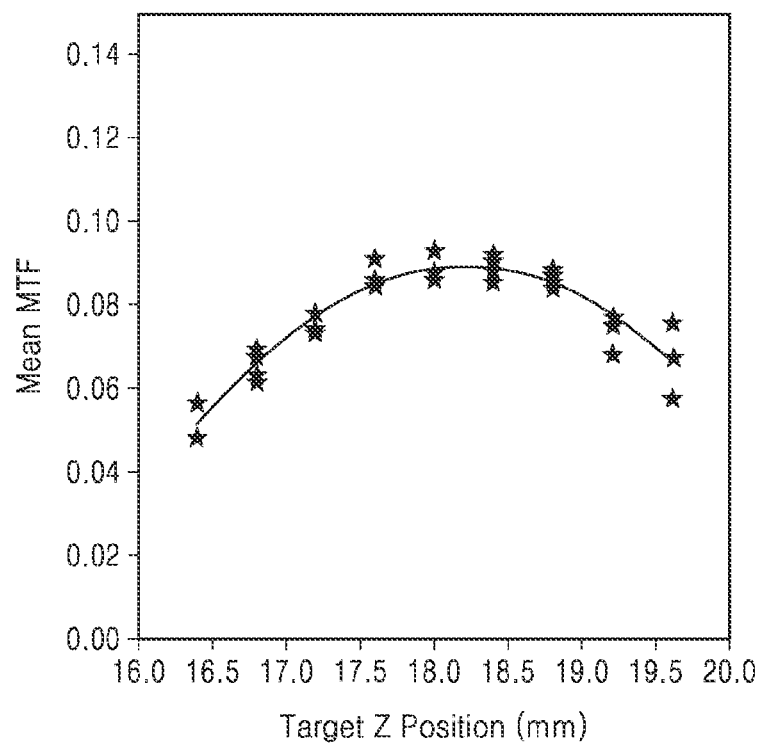

FIGS. 17A and 17B are graphs showing a comparison between an MTF value and a raw MTF value according to a method of measuring spatial resolution of electro-optical system, according to an embodiment.

Referring to FIGS. 17A and 17B, while the calculated MTF value may be used as an index for the performance of electro-optical system, in a process of assembling/aligning electro-optical system (e.g., an electro-optical camera), it may be used to find an optimal focal position through through-focus MTF. For example, when the MTF value is measured by moving the location of a target in an optical axis direction from a far position to a close position, the location of force changes, and thus, a change in the MTF value may change drawing a curve. In this state, the peak position of the curve is an optimal focal position.

FIG. 17A shows a measurement of the through-focus MTF by using an existing MTF measurement method, and FIG. 17B shows a measurement of the through-focus MTF by using the MTF measurement method according to an embodiment. Referring to FIG. 17A, first, while an MTF curve is approximately generated, the influence of the external micro-vibrations is reflected in each of measurement results, and thus, it is difficult to find an optimal focal position. Unlike the above, referring to FIG. 17B, as the influence of micro-vibrations is mitigated through the deep learning output, the MTF curve generated through the through-focus MTF may be stably generated, and the optimal focal position may be easily derived.

Various embodiments described above are illustrative, and are not to be discriminated from and implemented independently of one another. The embodiments described in this specification may be implemented in a combination with each other.

The embodiments of the disclosure can be written as computer programs and can be implemented in general-use digital computers that execute the programs using a computer readable recording medium. In this state, the medium may continuously store a program that can be executed by a computer, or may store a program for execution or download. Furthermore, the medium may be various recording devices or storing devices in which single or several hardware are combined, which it not limited to a medium that is directly accessed to a computer system and may be present over a network in a distribution manner. Examples of the medium include magnetic storage media such as floppy disks or hard disks, optical recording media such as CD-ROMs or DVDs, magneto-optical medium such as floptical disks, and ROM, RAM, flash memory, etc., which are configured to store program instructions. Furthermore, examples of other media may include application stores for distributing applications, sites for supplying or distributing other various software, and recording media or storing media managed at servers.

In the specification, terms such as " . . . portion," " . . . unit," " . . . module," and the like may signify a hardware component such as a processor or a circuit, and/or a software component executed by the hardware component such as a processor. For example, the terms such as " . . . portion," " . . . unit," " . . . module," and the like may be embodied by constituent elements, such as software constituent elements, object-oriented software constituent elements, class constituent elements, and task constituent elements, processes, functions, attributes, procedures, subroutines, segments of program code, drivers, firmware, micro code, circuit, data, database, data structures, tables, arrays, and variables.

According to the embodiments described above, an apparatus, method, and computer program for measuring spatial resolution of electro-optical system, by which the influence of ESF by micro-vibrations is mitigated by using deep learning techniques, may be implemented. As the influence of ESF by micro-vibrations is mitigated, the development period and manufacturing difficulty can be effectively reduced in developing electro-optical system. The scope of the disclosure is not limited by the above effects.

Thus, the above-described embodiments are exemplary in all aspects and should not be for purposes of limitation. For example, each constituent element described to be a single type may be embodied in a distributive manner. Likewise, the constituent elements described to be distributed may be embodied in a combined form.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the disclosure as defined by the following claims.

What is claimed is:

1. A method of measuring spatial resolution of electro-optical system, the method comprising:
   obtaining raw edge spread function (ESF) data from an edge image obtained by using the electro-optical system;
   obtaining a corrected ESF curve by inputting the raw ESF data to a deep learning model;
   obtaining a line spread function (LSF) curve by differentiating the corrected ESF curve;
   obtaining a modulation transfer function (MTF) curve by Fourier-transforming the LSF curve; and
   obtaining a MTF value from the MTF curve.

2. The method of claim 1, further comprising
   obtaining a plurality of sample ESF data;
   obtaining a plurality of sample MTF values respectively corresponding to the plurality of sample ESF data;
   selecting some sample ESF data from among the plurality of sample ESF data based on the plurality of sample MTF values;
   obtaining a ground-truth ESF curve by averaging the some sample ESF data; and
   training the deep learning model by using at least one of the plurality of sample ESF data and the ground-truth ESF curve as training data.

3. The method of claim 2, wherein the obtaining of a plurality of sample ESF data comprises:

obtaining a plurality of sample images by capturing images of a plurality of target samples, the plurality of target samples each having a knife-edge located at a preset pixel distance; and obtaining each of the plurality of sample ESF data from the plurality of sample images.

4. The method of claim 3, wherein the obtaining of the ground-truth ESF curve comprises:

arranging the some sample ESF data based on the preset pixel distance; and obtaining the ground-truth ESF curve by averaging the arranged some sample ESF data.

5. The method of claim 2, wherein the deep learning model is trained based on a central sample ESF data obtained from a target sample in which a knife-edge is located at a center among the plurality of sample ESF data, and the ground-truth ESF curve.

6. The method of claim 2, wherein the selecting of the some sample ESF data comprises:

selecting a plurality of intermediate MTF values located in a middle when the plurality of sample MTF values are arranged in order of size; and selecting the some sample ESF data respectively corresponding to the plurality of intermediate MTF values from among the plurality of sample ESF data.

7. The method of claim 2, wherein the training of the deep learning model comprises:

obtaining an output ESF curve by inputting one of the at least one of the plurality of sample ESF data to the deep learning model; and training the deep learning model to reduce a difference between the output ESF curve and the ground-truth ESF curve.

8. The method of claim 2, further comprising:

obtaining a ground-truth LSF curve by differentiating the ground-truth ESF curve; and obtaining a ground-truth MTF curve by Fourier-transforming the ground-truth LSF curve.

9. The method of claim 1, wherein the MTF value is a value corresponding to a Nyquist frequency value in the MTF curve.

10. A non-transitory computer-readable medium storing a computer program including instructions that, when executed by a processor, causes a computer to execute the method of claim 1.

11. An apparatus for measuring spatial resolution of electro-optical system, the apparatus comprising:

a memory; and a processor communicatively connected to the memory, and configured to obtain raw edge spread function (ESF) data from an edge image obtained by using the electro-optical system, obtain a corrected ESF curve by inputting the raw ESF data to a deep learning model, obtain a line spread function (LSF) curve by differentiating the corrected ESF curve, obtain a modulation transfer function (MTF) curve by Fourier-transforming the LSF curve, and obtain an MTF value from the MTF curve.

12. The apparatus of claim 11, wherein the processor is further configured to obtain a plurality of sample ESF data, obtain a plurality of sample MTF values respectively corresponding to the plurality of sample ESF data, select some sample ESF data from among the plurality of sample ESF data based on the plurality of sample MTF values, obtain a ground-truth ESF curve by averaging the some sample ESF data, and train the deep learning model by using at least one of the plurality of sample ESF data and the ground-truth ESF curve, as training data.

* * * * *